United States Patent Office 3,326,952
Patented June 20, 1967

3,326,952
METALLOCENYL SUBSTITUTED ORGANO-SILICON MATERIALS
Edward V. Wilkus, Albany, and Abe Berger, Schenectady, N.Y., assignors to General Electric Company, a corporation of New York
No Drawing. Filed May 27, 1963, Ser. No. 283,530
8 Claims. (Cl. 260—439)

The present invention relates to novel polymers having chemically combined silylmetallocenesiloxane units and to methods for making them.

The polymers included by the present invention are selected from, (a) polymers composed of chemically combined units of the formula, (1) 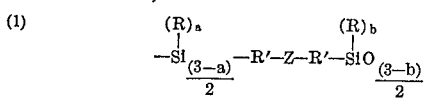

and (b) copolymers composed of chemically combined units of the formula, (2) 

and at least one nuit of (a), where Z is a divalent metallocenyl radical having the formula, (3) 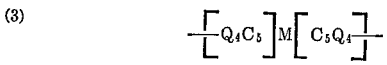

M is a transition metal, Q is chemically bonded to a five-membered carbocyclic and a member selected from the class of hydrogen, a monovalent electron withdrawing organic radical, a monovalent electron donating organic radical, and mixtures thereof, R is a member selected from a monovalent hydrocarbon radical, a halogenated monovalent hydrocarbon radical, a cyanoalkyl radical, and a fluoroalkyl radical, R' is a member selected from a divalent hydrocarbon radical, and —R''—Y—, R'' is a divalent hydrocarbon radical of at least two carbon atoms, and Y is a carbofunctional radical selected from carbonyl, carbinol, carbamino, and carbazido, $a$ is a whole number equal to from 0 to 3, inclusive, $b$ is a whole number equal to from 0 to 2, inclusive, and $c$ is a whole number equal to from 0 to 3, inclusive.

Radicals included by R of Formula 1 are aryl radicals and halogenated aryl radicals, such as phenyl, chlorophenyl, xylyl, tolyl, etc.; aralkyl radicals such as phenylethyl, benzyl, etc.; aliphatic, haloaliphatic, and cycloaliphatic such as alkyl, alkenyl, cycloalkyl, haloalkyl, including methyl, ethyl, propyl, butyl, cyclohexyl, viny, allyl, etc.; cyanoalkyl such as cyanoethyl, cyanopropyl, cyanobutyl, etc.; fluoroalkyl such as as fluoroethyl, fluorobutyl, etc. Radicals included by R' of Formula 1 are arylene radicals and alkylene radicals such as phenylene, tolylene, methylene, ethylene, trimethylene, tetramethylene, pentamethylene, decamethylene, etc.; radicals included by R'' above are all of the aforementioned R' radicals except methylene. Electron donating organic radicals included by Q are aromatic such as aryl and hydroxyaryl, for example, phenyl, tolyl, hydroxyphenyl, hydroxyphenyl, etc.; aliphatic radicals including alkyl radicals such as methyl, ethyl, propyl, butyl, octyl, etc.; alkenyl radicals such as vinyl, propenyl, etc.; cycloaliphatic such as cyclohexyl, cycloheptyl, etc.; caboxy aliphatic such as carboxymethyl, carboxyethyl, etc.; triorganosilyl radicals such as trimethylsilyl, dimethylphenylsilyl, etc.; nitroaliphatic such as nitromethyl, nitroethyl, etc.; electron withdrawing radicals included by Q are aliphatic acyl, such as formyl, acetyl, propionyl, arylacyl such as benzoyl, etc.; carboxy, aldehydic; sulfo; carboxyaryl, such as carboxyphenyl, carboxytolyl, etc.; nitroaryl such as nitrophenyl; haloaryl, such as chlorophenyl, bromotolyl, etc.; haloaliphatic such as chloromethyl, chloroethyl, etc. Radicals included by either R or Q respectively, can be all the same radical, or any two or more of the aforementioned R or Q radicals. Similarly, R' can be the same or a different radical included by R' above, for each unit of Formula 1.

M of Formula 3, includes all metals of Group III to VIII of the Periodic Table capable of producing a metallocene by forming a π complex with cyclopentadiene. Unless otherwise designated, the term "metallocene" as employed in the description of the present invention, is an organo metallic compound of a transition metal chemically combined with two five-membered carbocyclics substituted with either hydrogen, or a mixture of hydrogen with either monoavlent electron donating radicals, or monovalent electron withdrawing radicals, or mixtures thereof. The transition metals that are operative in the present invention are preferably iron, osmium, and ruthenium. However, other metals included within atomic numbers 22 to 28, 40 to 46, and 72 to 78 can be employed, such as titanium, vanadium, chromium, manganese, cobalt, nickel, zirconium, columbium, molybdenum, technitium, rhodium, palladium, hafnium, tantalum, tungsten, rhenium, iridium, and platinum.

The polymers composed of chemically combined units of Formula 1, can be made by effecting the hydrolysis of a bis-(silylorgano)metallocene having the formula, (4) 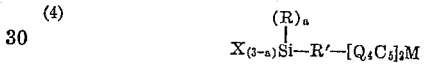

where M, Q, R', R and $a$ are as defined above, and X is a halogen radical such as chloro, bromo, etc. Where $a$ in Formula 4 is equal to 3, polymers composed of units of Formula 1, can be made by direct dealkylation such as demethylation of the bis-(silylorgano) metallocene of Formula 4. Dealkylation can be achieved by employing concentrated sulphuric acid. Cleavage of silicon-carbon bonds, converts the bis-(silylorgano)metallocene to the hydrolyzable disulfato form.

Some of the bis-(silylorgano)metallocenes of Formula 4, can be made by methods described in copending application Serial No. 283,525 filed May 27, 1963 assigned to the same assignee as the present invention. For example, a metallocene having the formula, (5) $[(Q'')_e(Q')_d(H)_cC_5]_2M$ can be diacylated with a silyl acid halide of the formula, (6) 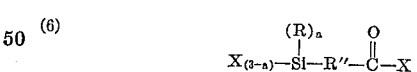

where M, R, R'', X and $a$ are as defined above Q' is a monovalent electron donating organic radical, Q'' is a monovalent electron withdrawing organic radical, $c$ is an integer equal to from 1 to 5, inclusive, $d$ is a whole number equal to from 0 to 4, inclusive, $e$ is a whole number equal to 0 or 1, while the sum of $c$, $d$ and $e$ is equal to 5.

Methods described in copending application Serial No. 283,526 filed May 27, 1963, assigned to the same assignee as the present invention, can be employed to make the bis-(silylorgano)-metallocenes of Formula 4 in the form of bis-(silylmethylene) metallocenes; bis-(silylethylene) metallocenes also can be made in accordance with the procedure employed by Nesmeyanof et al., Izv., An. SSR, Otd. Khim 11, 1982 (1961), by use of organo lithium compounds. In addition, the carbonyl groups, formed by diacylating a metallocene of Formula 5, with a silyl acid halide of Formula 6, can be reduced to a methylene group, or modified to other forms in accordance with standard chemical procedures, as shown in copending application Serial No. 283,525 filed May 27, 1963.

A method for preparing some of the silylorganocarboxylic acid halides of Formula 6 is shown by Sommer et al., J. Am. Chem. Soc., 73, 5130 (1951), which involves the alkylation of a malonic ester with a haloalkyltrialkylsilane, followed by halogenating the resulting acid. Another method is shown by Petrov et al., D. Akad Nauk, SSSR 100, 711 (1955) who utilize beta-cyanoalkyltrihalosilane which is initially alkylated and then hydrolyzed.

Some of the preferred metallocenes included by Formula 5 are ferrocene, ruthenocene, and osmocene, which are shown by M. D. Rausch et al., J. Am. Chem. Soc. 82, 76 (1960).

Included by the bis-(silylorgano)metallocenes of Formula 4 are for example, 1,1'-bis(trimethylsilylpropionyl)-ferrocene, 1,1'-bis(trimethylsilylpropionyl)ruthenocene, 1,1'-bis(trimethylsilylpropionyl)osmocene, 1,1'-bis(trimethylsilyltrimethylene)ferrocene, 1,1'-bis(trimethylsilyltrimethylene)ruthenocene, 1,1'-bis(trimethylsilyltrimethylene) - osmocene, 1,1' - bis(dimethylchlorosilylpropionyl)ferrocene, 1,1'-bis(dimethylchlorosilylpropionyl)ruthenocene, 1,1'-bis(dimethylchlorosylpropionyl)osmocene, 1,1'-bis(dimethylvinylsilylpropionyl)ferrocene, 1,1'-bis(diethylvinylsilylpropionyl)ferrocene, 1,1'-bis(dimethylvinylsilylpropionyl)ruthenocene, 1,1' - bis(dimethylvinylsilylpropionyl)-osmocene, 1-trimethylsilylpropionyl-1'-trimethylsilyltrimethyleneferrocene, 1-trimethylsilylpropionyl-1'-methyl-ferrocene, 1-dimethylphenylsilylbutanoyl-1'-phenylruthenocene, 1-dimethylvinylsilylpentanoyl-1'-sulfoosmocene, 1-trimethylsilylpropionyl-1'-chlorophenylferrocene, 1-dimethylphenylsilylpropionyl-1'-trimethylsilylosmocene, 1 - trimethylsilylphenylmethylene-1'-dimethylvinylsilyltrimethyleneosmocene, 1-trimethylsilylphenylmethylene - 2-methyl-1'-dimethylvinylsilyltrimethyleneosmocene, 1 - (2-hydroxybenzoyl)-1'-omega-trimethylsilylpropionylferrocene.

The copolymers of the present invention having chemically combined units of Formulae 1 and 2, can be made by effecting the cohydrolysis of silanes of Formula 4 with halosilanes of the formula, (8) 

where R, X and c are as previously defined. In forming the copolymers there is preferably used, at least 0.001 mole of the silanes of Formula 4, per mole of the halosilanes of Formula 8.

Included by the halosilanes of Formula 8 are methyltrichlorosilane, dimethyldichlorosilane, methylphenyldichlorosilane, cyanoethylmethyldichlorosilane, trimethylchlorosilane etc.

The polymers and copolymers composed of units included by Formulae 1 and 2 of the present invention can be chain-stopped with silanol radicals and can be in the form of viscous liquids, fluids, gums, rubbery solids, and hard resins depending upon the composition of the molecular weight of the polymer. These polymers can be employed in a variety of applications such as U.V. absorbers, heat-age additives for organopolysiloxane compositions, antioxidants, etc.

In the practice of the invention, a bis-(silylorgano)metallocene, such as shown in Formula 4, is hydrolyzed or cohydrolyzed with a halosilane to form a silylmetallocenyl siloxane polymer of the present invention. Hydrolysis or cohydrolysis of the bis-(silylorgano)metallocene can be achieved in accordance with standard conditions and hydrolysis procedures normally employed for hydrolyzing organohalosilanes. In instances where the bis-(silylorgano)-metallocene cannot be readily hydrolyzed in accordance with standard procedures, such as when it is in the form of a bis-(triorganosilylorgano)metallocene, it can be converted to the readily hydrolyzable form by the employment of sulphuric acid cleavage reaction. Cleavage of the silicon bond of the bis-(triorganosilylorgano)metallocene converts the bis-substituted metallocene to the readily hydrolyzable disulfato form which can be hydrolyzed in accordance with standard hydrolysis procedures used for organohalosilanes.

Agitation of the hydrolysis mixture along with the employment of an organic solvent to facilitate the production of the silylmetallocenesiloxane polymer can also be utilized. Suitable organic solvents that can be employed are for example, methylene chloride, benzene, toluene, etc. Temperatures that can be utilized are from 0° C. or lower, to as high as 100° C. or higher, depending upon the physical limitations of the components utilized in the hydrolysis mixture.

Recovery of the hydrolyzate can be achieved in accordance with standard separation methods, such as stripping, and chromatography, etc.

In order that those skilled in the art will be better able to practice the present invention, the following examples are given by way of illustration and not by way of limitation. All parts are by weight.

*Example 1*

There were added to 0.50 part of 1,1'-bis(beta-trimethylsilylpropionyl)ferrocene, 18 parts of concentrated sulphuric acid. Methane was immediately evolved from the mixture and it was agitated for about 30 minutes. The resulting reaction mixture was then added to 25 parts of water. The hydrolysis mixture was allowed to stand for 19 hours. Water was then decanted from the product, and it was extracted with methylene chloride and dried over alumina. A viscous orange residue was obtained drawable into fine wispy filaments, after the product was stripped of solvent to a constant weight. The yield of product based on the starting substituted metallocene was 93%. Its infrared spectrum showed siloxane linkages superimposed on the spectrum of 1,1'-bis(beta-trimethylsilylpropionyl)ferrocene and terminal silanol radicals. Based on method of preparation and its infrared spectrum, the product was a silanol chain-stopped polymer composed of chemically combined units of the formula,

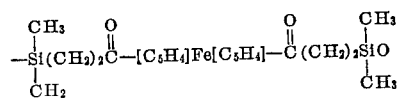

There is added to a polydimethylsiloxane having a viscosity of about 7,000,000 centipoises at 25° C., while it is milled on a rubber mill, 0.1 part of the above polymer per 100 parts of the polydimethylsiloxane. There are also added to the resulting mixture, 40 parts of fumed silica filler per 100 parts of the polydimethylsiloxane. In addition, there are also added to the mixture while it is milled, 2 parts of benzoyl peroxide. A sheet is formed from the milled mixture and cut into slabs. The procedure is repeated, except that slabs are made free of the polymer. The various slabs are press-cured for 10 minutes at 150° C., and post-cured for 24 hours at 315° C. It is found that the slabs containing the polymer of Example 1, exhibit superior resistance to heatage compared to the slabs free of the polymer.

*Example 2*

There were added to 98 parts of dry methylene chloride, with stirring, 4.52 parts of ferrocene and 9.68 parts of gamma-chlorodimethylsilylbutyrylchloride. The mixture was then stirred for an additional 10 minutes to completely dissolve the components. There were gradually added to the resulting solution over a period of about 2 hours, 6.8 parts of aluminum chloride. Throughout the addition, nitrogen was passed above the mixture. The mixture was stirred for an additional 24 hours, until hydrogen chloride could not be detected. The mixture was then added to an externally cooled solution of 50 parts of water and about 7 parts of concentrated hydrochloric acid. There were added to the resulting hydrolysis mixture, about 35 parts of methylene chloride and it was allowed to stand about 14 days. The organic layer was separated, and it was washed with water and neutralized with a 5% aqueous potassium hydroxide solution.

The product was recovered by stripping it of solvent, and then purifying it by chromatography using a column prepared with n-hexane and neutral 80-mesh alumina. Elution with n-hexane, and mixtures such as hexane and ether, provided for the recovery of a viscous, bright orange product. Its infrared spectrum showed the presence of siloxane superimposed on the spectrum of the starting substituted ferrocene and terminal silanol radicals. Based on its method of preparation and infrared spectrum, the product was a silanol chain-stopped polymer composed of chemically combined units of the formula,

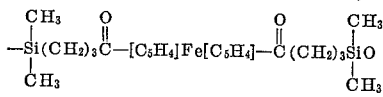

*Example 3*

In accordance with the procedure of Example 1, a mixture of 2½ parts of 1,1'-bis(gamma-trimethylsilylbutyryl)-osmocene and 90 parts of concentrated sulphuric acid are agitated until no more methane is evolved. The mixture is then hydrolyzed in about 150 parts of water which is cooled externally, and the resulting hydrolysis mixture is allowed to stand for about 24 hours. The water is then decantered and the product is taken up with methylene chloride, dried, and then stripped of solvent to a constant weight. The product is purified by chromatography using a column prepared with n-hexane and neutral alumina. Infrared spectrum of the product shows the presence of siloxane superimposed in the spectrum of the starting substituted osmocene, and terminal silanol radicals. Based on its method of preparation and infrared spectrum, the product is a silanol chain-stopped polymer composed of chemically combined units of the formula,

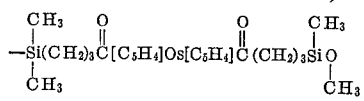

*Example 4*

There are added to 0.5 part of 1,1'-bis(deltatrimethylsilylbutyl)ferrocene, 5.4 parts of concentrated sulphuric acid. The aforementioned 1,1'-bis(delta-trimethylsilylbutyl)ferrocene was made from the corresponding 1,1'-bis(gamma - trimethylsylbutyryl)ferrocene by reducing the carbinol groups with a mercury-zinc amalgam in an aqueous hydrochloric acid solution. The demethylation of the 1,1'-bis(delta-trimethylsilylbutyl)ferrocene was completed after about 10 minutes time. The reaction mixture was then added to 35 parts of cold water. There were then added to the resulting hydrolysis mixture, about 65 parts of methylene chloride followed by neutralization of the mixture with aqueous 5% potassium hydroxide. The organic layer was then separated and the water layer was extracted twice with an ether-methylene chloride mixture. A viscous, yellow product was obtained. After the solvent was dried and stripped, a 93% yield of product was obtained based on the starting material. Its infrared spectrum showed the presence of silanol, and siloxane, superimposed on the spectrum of the starting 1,1'-bis(delta-trimethylsilylbutyl)-ferrocene. Based on its method of preparation and infrared spectrum, the product was a silanol chain-stopped polymer composed of chemically combined units of the formula,

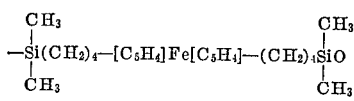

*Example 5*

There were added 5.4 parts of concentrated sulphuric acid to 0.25 part of 1,1'-bis-gamma-trimethylsilylpropyl)-ferrocene. After there was no further evolution of methane from the mixture, 1.5 part of dimethyldichlorosilane was added, and the resulting mixture was shaken until no further evolution of hydrogen chloride was detected. There was then added to the mixtuer, 25 parts of cold water. The cohydrolyzate was recovered in accordance with the procedure of Example 1, resulting in the recovery of 0.70 part of a crude fluid product. The product was chromatographed using a neutral 80-mesh alumina n-hexane column. There was recovered about a 55% yield of product based on the starting material. Its infrared spectrum showed the presence of polydimethylsiloxane absorption bands and silanol, as well as absorption bands due to the original bis(trimethylsilylpropyl)ferrocene. Based on the method of preparation and its infrared spectrum, the product was a silanol chain-stopped copolymer composed of the following chemically combined structural units,

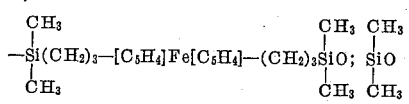

*Example 6*

The procedure of Example 1 is repeated except that 1,1' - bis(beta - trimethylsilylpropyl)ruthenocene is demethylated with concentrated sulphuric acid. A product is recovered utilizing the same procedure as in Example 1. There is obtained a yield of about 50% of product based on the starting material, following the procedure utilized in Example 1. The infrared spectrum of the product shows the presence of siloxane superimposed on the spectrum of 1,1' - bis(beta-trimethylsilylpropyl)ruthenocene and silanol. Based on its method of preparation of its infrared spectrum, the product is a silanol chain-stopped polymer composed of chemically combined units having the formula,

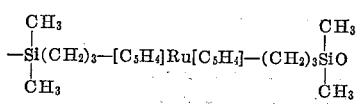

While the foregoing examples have of necessity been limited to only a few of the very many variables with respect to the process and polymers within the scope of the present invention, it should be understood that the present invention covers a much broader class of polymers and copolymers composed of chemically combined units of Formulae 1 and 2, and methods for making them. These polymers having radicals shown by Formula 3, can be composed of any one of a variety of transition metals previously described chemically combined with cyclopentadienyl radicals.

What we claim as new and desire to secure by Letters Patent of the United States is:

1. Organosilicon polymers selected from the class consisting of, (a) polymers composed of chemically combined units of the formula,

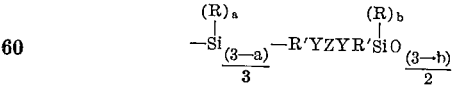

and (b) copolymers composed of chemically combined units of the formula,

and at least one unit of (a), where R is a member selected from the class consisting of monovalent hydrocarbon radicals, halogenated monovalent hydrocarbon radicals, cyanoalkyl radicals, and fluoroalkyl radicals, R' is a divalent radical having from 2 to 7 carbon atoms inclusive, selected from the class consisting of alkylene radicals and arylene radicals, Y is a carbofunctional radical selected from the class consisting of methylene and carbonyl, Z is a divalent organometallic radical of a metallocene selected from the class consisting of ferrocene, osmocene, and ruthenocene substituted with radicals selected from the class consisting of hydrogen, aryl radicals, alkyl radicals and mixtures thereof, *a* is a whole number equal to from 0 to 3, inclusive, *b* is a whole number equal to 0 to 2, inclusive, and *c* is a whole number equal to from 0 to 3, inclusive.

2. Organosilicon polymers composed of chemically combined units of the formula:

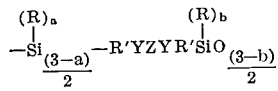

where R is a member selected from the class consisting of monovalent hydrocarbon radicals, halogenated monovalent hydrocarbon radicals, cyanoalkyl radicals, and fluoroalkyl radicals, R' is a divalent radical having from 2 to 7 carbon atoms inclusive, selected from the class consisting of alkylene radicals and arylene radicals, Y is a carbofunctional radical selected from the class consisting of methylene and carbonyl, Z is a divalent organometallic radical of a metallocene selected from the class consisting of ferrocene, osmocene, and ruthenocene substituted with radicals selected from the class consisting of hydrogen, aryl radicals, alkyl radicals and mixtures thereof, *a* is a whole number equal to from 0 to 3, inclusive, *b* is a whole number equal to 0 to 2, inclusive, and *c* is a whole number equal to from 0 to 3, inclusive.

3. Organosilicon copolymers composed of chemically combined units of the formula,

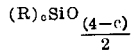

and at least one unit of the formula,

where R is a member selected from the class consisting of monovalent hydrocarbon radicals, halogenated monovalent hydrocarbon radicals, cyanoalkyl radicals, and fluoroalkyl radicals, R' is a divalent radical having from 2 to 7 carbon atoms inclusive, selected from the class consisting of alkylene radicals and arylene radicals, Y is a carbofunctional radical selected from the class consisting of methylene and carbonyl, Z is a divalent organometallic radical of a metallocene selected from the class consisting of ferrocene, osmocene, and ruthenocene substituted with radicals selected from the class consisting of hydrogen, aryl radicals, alkyl radicals and mixtures thereof, *a* is a whole number equal to from 0 to 3, inclusive, *b* is a whole number equal to 0 to 2, inclusive, and *c* is a whole number equal to from 0 to 3, inclusive.

4. A polymer consisting essentially of chemically combined units of the formula,

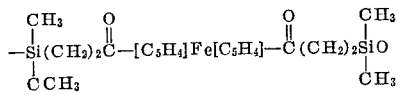

5. A polymer consisting essentially of chemically combined units of the formula,

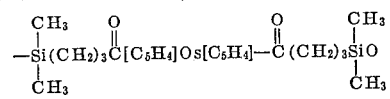

6. A polymer consisting essentially of chemically combined units of the formula,

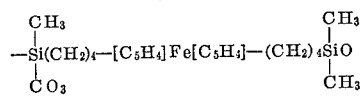

7. A copolymer consisting essentially of chemically combined units of the formulae,

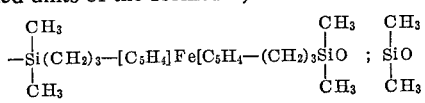

8. A polymer consisting essentially of chemically combined units of the formula,

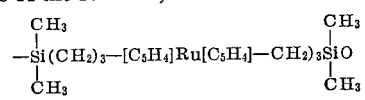

References Cited

Eaborn: Organosilicon Compounds; New York Academic Press Inc., 1960; pp. 228–229.

TOBIAS E. LEVOW, *Primary Examiner.*

HELEN M. McCARTHY, *Examiner.*

J. G. LEVITT, P. F. SHAVER, *Assistant Examiners.*